US009652082B1

(12) United States Patent
Lin et al.

(10) Patent No.: US 9,652,082 B1
(45) Date of Patent: May 16, 2017

(54) SPACE EFFICIENT ELECTRONIC DEVICE COMPONENT CONFIGURATIONS

(71) Applicant: Amazon Technologies, Inc., Reno, NV (US)

(72) Inventors: Jun Lin, Morgan Hill, CA (US); Anurupa Rao, Sunnyvale, CA (US); Amrinder Pal Singh Saini, Union City, CA (US)

(73) Assignee: Amazon Technologies, Inc., Reno, NV (US)

( * ) Notice: Subject to any disclaimer, the term of this patent is extended or adjusted under 35 U.S.C. 154(b) by 113 days.

(21) Appl. No.: 14/464,502

(22) Filed: Aug. 20, 2014

(51) Int. Cl.
*G06F 3/041* (2006.01)
*G06F 3/042* (2006.01)
*G06F 1/16* (2006.01)
*G06F 3/0354* (2013.01)

(52) U.S. Cl.
CPC .......... *G06F 3/0421* (2013.01); *G06F 1/1633* (2013.01); *G06F 3/0412* (2013.01); *G06F 1/1637* (2013.01); *G06F 1/1658* (2013.01); *G06F 3/0354* (2013.01); *G06F 3/03547* (2013.01); *G06F 3/042* (2013.01)

(58) Field of Classification Search
CPC ......... G06F 3/0421; G06F 2203/04108; G06F 1/1633; G06F 1/1637; G06F 1/1643; G06F 1/1656; G06F 1/1658; G06F 1/1694; G06F 1/18; G06F 1/181; G06F 3/0354; G06F 3/03547; G06F 3/041; G06F 3/0412; G06F 3/0416; G06F 2203/04109; G06F 3/042

USPC ........................................................ 345/175
See application file for complete search history.

(56) References Cited

U.S. PATENT DOCUMENTS

| 3,060,319 | A  | 10/1962 | Greunke |
| 3,611,359 | A  | 10/1971 | Panerai et al. |
| 3,775,560 | A  | 11/1973 | Ebeling et al. |
| 4,459,476 | A  | 7/1984  | Weissmueller et al. |
| 4,673,918 | A  | 6/1987  | Adler et al. |
| 4,872,000 | A  | 10/1989 | Kano et al. |
| 4,986,662 | A  | 1/1991  | Bures |
| 5,097,396 | A  | 3/1992  | Myers |
| 5,220,409 | A  | 6/1993  | Bures |
| 5,307,245 | A  | 4/1994  | Myers et al. |
| 5,933,211 | A  | 8/1999  | Nakasugi et al. |
| 5,981,938 | A  | 11/1999 | Benoliel |
| 6,140,654 | A  | 10/2000 | Nakasugi et al. |
| 6,172,667 | B1 | 1/2001  | Sayag |
| 6,178,035 | B1 | 1/2001  | Eda et al. |
| 6,690,363 | B2 | 2/2004  | Newton |
| 6,864,882 | B2 | 3/2005  | Newton |
| 7,289,088 | B2 | 10/2007 | Matsumoto |
| 7,421,167 | B2 | 9/2008  | Charters et al. |
| 7,656,391 | B2 | 2/2010  | Kimura et al. |

(Continued)

FOREIGN PATENT DOCUMENTS

WO        WO03063069         7/2003

*Primary Examiner* — Julie Ann Watko (74) *Attorney, Agent, or Firm* — Lee & Hayes, PLLC (57) ABSTRACT

Some implementations include electronic devices having space efficient component configurations. In some instances, an electronic device may include an electronic display, a light source, and a lightguide having one or more reflective surfaces. This disclosure describes, in part, configurations of these and other components that create opportunities for efficiently using space associated with the electronic device.

20 Claims, 8 Drawing Sheets

(56) References Cited

U.S. PATENT DOCUMENTS

| | | |
|---|---|---|
| 8,055,022 B2 | 11/2011 | Morrison et al. |
| 8,089,462 B2 | 1/2012 | Hill et al. |
| 8,094,137 B2 | 1/2012 | Morrison |
| 8,115,753 B2 | 2/2012 | Newton |
| 8,120,596 B2 | 2/2012 | Popovich et al. |
| 8,149,221 B2 | 4/2012 | Newton |
| 8,203,535 B2 | 6/2012 | Morrison et al. |
| 8,228,304 B2 | 7/2012 | Morrison et al. |
| 8,274,496 B2 | 9/2012 | Ung et al. |
| 8,289,299 B2 | 10/2012 | Newton |
| 8,325,134 B2 | 12/2012 | Hill et al. |
| 8,339,378 B2 * | 12/2012 | Chtchetinine ......... G06F 3/0416 178/18.09 |
| 8,378,986 B2 | 2/2013 | Morrison et al. |
| 8,384,693 B2 | 2/2013 | Newton |
| 8,405,636 B2 | 3/2013 | Bridger |
| 8,405,637 B2 | 3/2013 | Bridger |
| 8,432,377 B2 | 4/2013 | Newton |
| 8,436,834 B2 | 5/2013 | Cheng et al. |
| 8,456,418 B2 | 6/2013 | Ung et al. |
| 8,456,447 B2 | 6/2013 | Newton |
| 8,456,451 B2 | 6/2013 | Morrison et al. |
| 8,466,885 B2 | 6/2013 | Newton |
| 8,508,508 B2 | 8/2013 | Newton |
| 8,576,172 B2 | 11/2013 | Hill et al. |
| 8,760,602 B2 | 6/2014 | Minami |
| 8,786,409 B2 * | 7/2014 | Zwart ................... G06F 1/1601 340/12.1 |
| 2004/0212603 A1 * | 10/2004 | Cok ....................... G06F 3/0412 345/175 |
| 2005/0168134 A1 * | 8/2005 | Nishikawa ............ G06F 3/0421 313/500 |
| 2007/0046625 A1 * | 3/2007 | Yee ........................ G06F 3/0416 345/156 |
| 2009/0058832 A1 * | 3/2009 | Newton ................ G06F 3/0421 345/175 |
| 2009/0122027 A1 * | 5/2009 | Newton ................ G06F 3/0436 345/175 |
| 2010/0321344 A1 * | 12/2010 | Yen ........................ G06F 3/0428 345/175 |
| 2011/0043490 A1 * | 2/2011 | Powell ................. G06F 3/0421 345/176 |
| 2012/0068973 A1 | 3/2012 | Christiansson et al. |
| 2014/0028629 A1 * | 1/2014 | Drumm ................ G06F 3/0308 345/175 |
| 2014/0376234 A1 * | 12/2014 | Kroghahl ............. H04M 1/026 362/307 |

\* cited by examiner

SPACE EFFICIENT ELECTRONIC DEVICE COMPONENT CONFIGURATIONS

BACKGROUND

A large and growing population of users is enjoying entertainment through the consumption of digital content, such as music, movies, images, electronic books, and so on. For example, users may consume digital content via electronic devices that include an electronic display. Examples of such electronic devices may include electronic book ("eBook") readers, cellular telephones, smart phones, portable media players, tablet computers, wearable computers, laptop computers, netbooks, desktop computers, televisions, appliances, home electronics, automotive electronics, navigation devices, and augmented reality devices, to name a few. Form factor and other physical characteristics associated with an electronic device can affect user experience. Accordingly, finding ways to enhance user experience and satisfaction in connection with electronic devices continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, electronic devices (or "devices") that include an electronic display (or "display") for presenting digital content to one or more users. This disclosure also describes, in part, space efficient electronic device component configurations.

For instance, in some implementations, the display of the electronic device may have a front surface from which a user views content. The display may further include a back surface that is opposite to the front surface.

In some cases, the electronic device may include a light source, a lightguide, and a light sensor. The light source may be disposed below the bottom surface of the display. Further, the light source may be configured to emit a ray of light at a non-zero angle relative to the front surface of the display. The lightguide may be configured to direct light from the light source to the light sensor, which may be configured to detect light emitted by the light sensor for touch sensing associated with the display. In a particular example, the light source may be a light-emitting diode (LED) operable to emit infrared (IR) light, and the light sensor may be a photodiode configured to detect IR light.

The lightguide may have one or more reflective surfaces that cooperatively direct the light emitted by the light source to the front surface of the display, across at least a portion of the front surface of the display, and to the light sensor. In some cases, the light may travel along one or more paths that are substantially parallel to the front surface of the display.

While the front surface of the display may define a first plane, the light source may be coupled to a substrate [e.g., a printed circuit board (PCB)] having a surface that defines a second plane. According to some implementations, the second plane that is defined by the surface of the substrate is non-parallel to the first plane that is defined by the front surface of the display.

In some implementations, the lightguide may include one or more surfaces that are at least partially coated with an IR reflective substance, allowing for other components or surfaces of the electronic device to be in contact with the coated surfaces without them influencing the manner in which the coated surfaces reflect light. Coating surfaces of the lightguide with the IR reflective substance may eliminate the need for an air gap between these surfaces and other components or surfaces of the electronic device.

Additionally, or alternatively, the lightguide may include a diffuser positioned above the top surface of the display. The diffuser may be configured to illuminate the front surface of the display, at least in part, with visible light emitted by the light source or otherwise emitted from within the electronic device.

According to some implementations, the lightguide may include a front portion and a back portion. The front portion may include a front external surface of the device, and the back portion may include a back external surface of the device that is opposite to the front external surface of the device.

In some cases, the light source may be disposed proximate to the back portion of the lightguide. Further, the light source may be operable to emit light towards the back portion of the lightguide. The lightguide may be configured to direct light emitted by the light source from the back portion of the lightguide to the front portion of the lightguide. In some examples, the front portion may comprise a front cover component that extends across at least a portion of the front surface of the display. Light emitted by the light source may travel through at least a portion of the front cover component before being detected by the light sensor. In some examples, the front cover component may be at least partially coated with an IR transparent substance so that IR light emitted by the light source may travel through the front cover component.

According to some implementations, the front portion of the lightguide may include a sign-of-life indicator that is illuminated by visible light emitted by the light source or otherwise emitted from within the device. The sign-of-life indicator may indicate to a user a level of electric power associated with the device.

A touch event associated with the display may be determined based at least partly on whether the light sensor receives light emitted by the light source. For example, if a user applies a finger, stylus, or the like, such that it blocks light traveling across the front portion of the display, then the light sensor may not receive or detect the light emitted by the light source. Accordingly, the device may determine that a touch event has occurred. Additionally, or alternatively, the device may determine the location of the touch event relative to the display.

The foregoing discussion is provided for the reader's convenience and is not intended to limit the scope of the claims or the disclosure herein. Furthermore, the techniques and arrangements described above and below may be implemented in a number of ways and in a number of contexts. Several example implementations and contexts are provided with reference to the figures, as described below in more detail. However, the example implementations and contexts described herein are but a few of many possible implementations, contexts, and environments.

Figure 1:
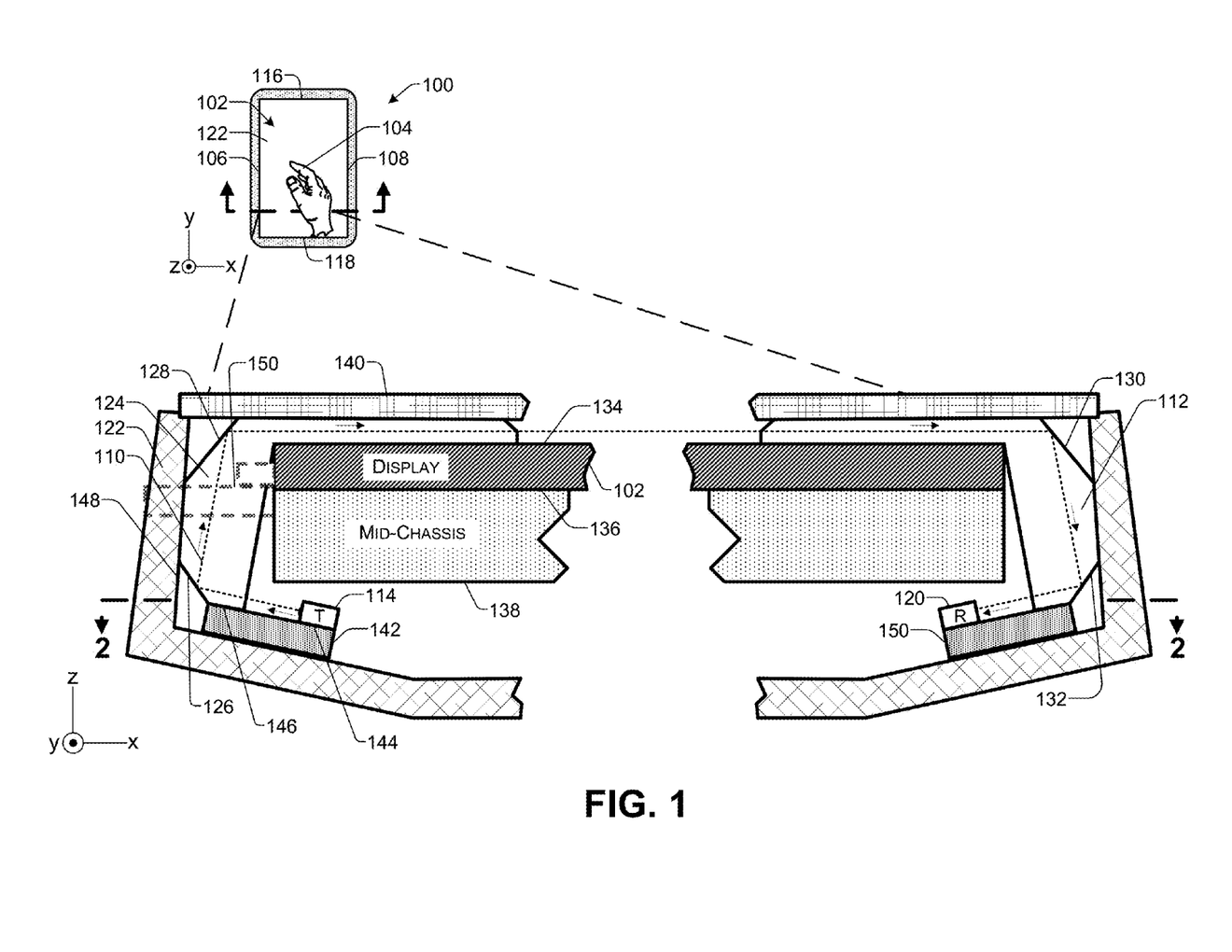
FIG. 1 illustrates a cross-section side elevation view of an example electronic device having space efficient component configurations according to some implementations.

FIG. 1 illustrates a cross-section side elevation view of an example electronic device 100 having space efficient component configurations according to some implementations. For clarity, suppose x-, y-, and z-dimensions of a three-dimensional coordinate system are defined with respect to the electronic device 100 as indicated in FIG. 1.

In some instances, the electronic device 100 may be a portable or hand-held electronic device. In other instances, the electronic device 100 may be a fixed or generally non-portable device. Non-limiting examples of the electronic device 100 may include eBook readers, smart phones, cellular phones, portable media players, navigation devices, tablet computing devices, personal computers, netbooks, laptops, cash registers, kiosks, touch screens, appliances, gaming devices, home electronics, industrial machinery, robots, and so forth. Accordingly, while some implementations herein are described in the environment of an eBook reader, this disclosure is not limited to use with an eBook reader but may be used with any type of electronic device 100 having a display 102, such as any of the devices 100 listed above.

The electronic device 100 may include a display 102 for presenting information to a user. For example, the display 102 may display numerous different types of text and images, such as in association with various content items, user interfaces, controls, functions, and the like. In some implementations, the display 102 may include electrophoretic, pigmented electrophoretic, electrofluidic, interferometric, cholesteric liquid crystal, bi-stable LCDs, MEMS or other stable display technology that retains an image with no or little power applied to the display. In one implementation, the display 102 uses electronic paper or electronic ink display technology, which is bi-stable. Accordingly, the display 102 may be capable of holding text or other images even when very little or no power is supplied to the display 102.

In some implementations, a light-based touch control technology may be associated with the display 102 for receiving/detecting a touch input from a finger 104 of a user, from a stylus, or other type of physical pointer. For example, one or more first set of light sources or transmitters 114 may radiate light over the display 102 in a first direction, such as from a first side 106 of the display 102 to a second side 108 of the display 102 that is opposite the first side 106, as indicated by dashed lines 110. The terms "light" and "ray of light" may be used interchangeably throughout this disclosure. As used in this disclosure, the terms "light" and "ray of light" may indicate an idealized model of light that is emitted by the light transmitters 114. For example, the idealized model may be obtained by choosing a line that is perpendicular to the wavefronts of the actual light, and that points in a direction of energy flow.

Figure 2:
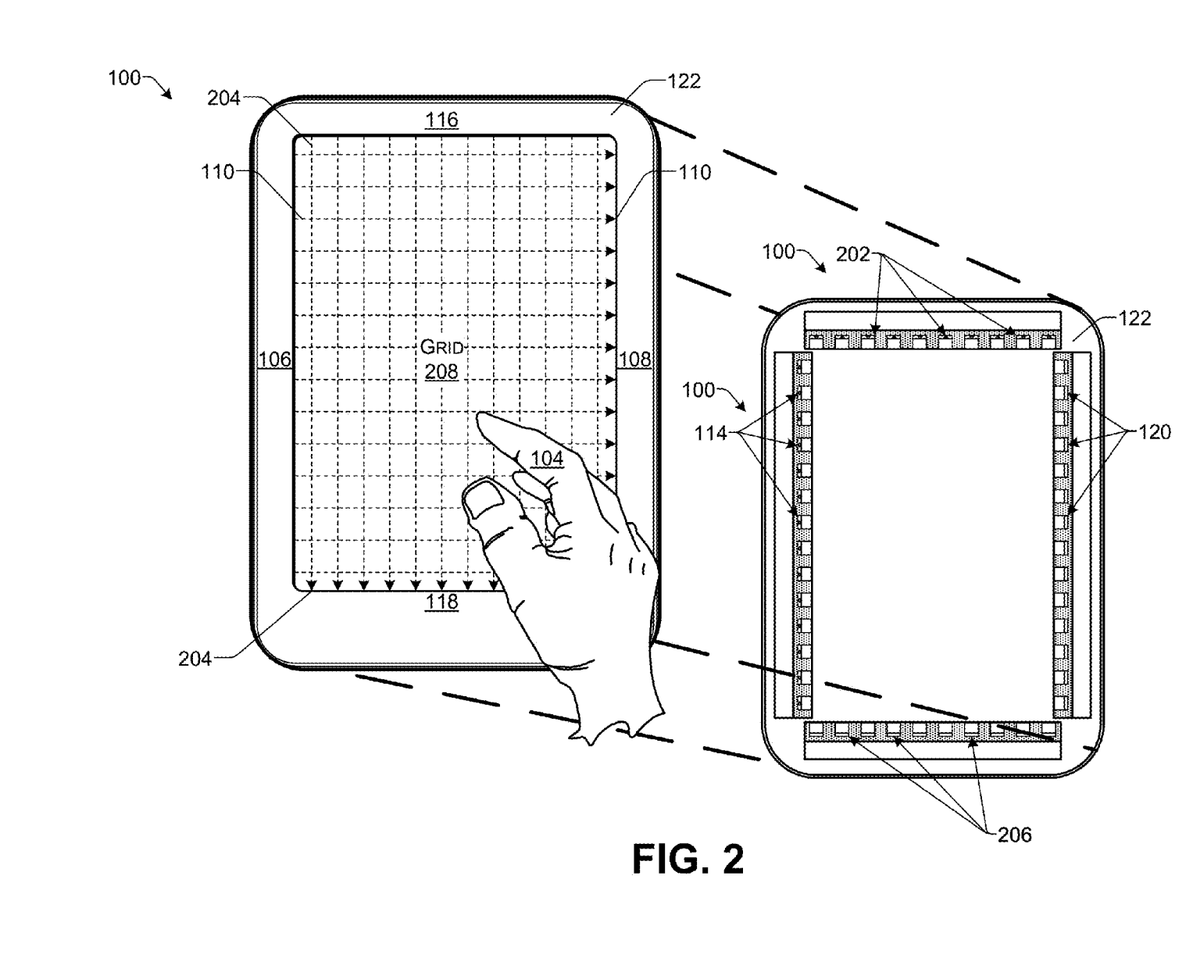
FIG. 2 illustrates a cross-section top view of the example electronic device of FIG. 1, according to some implementations, as taken along line 2-2 of FIG. 1.

FIG. 2 illustrates a cross-section top view of the example electronic device of FIG. 1, according to some implementations, as taken along line 2-2 of FIG. 1. Referring to FIGS. 1 and 2, one or more second light transmitters 202 may project light in a second direction, generally normal or perpendicular to the first direction, such as from a third side 116 of the display 102 to a fourth side 118 of the display 102 that is opposite the third side 116, as indicated by dashed lines 204. A first array of light sensors or receivers 120 may be provided on the second side 108 of the display 102, and a second array of light receivers 206 may be provided along the fourth side 118 of the display 102 to establish a grid 208, as indicated by the multiple crossings of lines 110 and 204. In some cases, however, the light projected in the second direction is not necessarily perpendicular to the first direction. For example, a single light transmitter may project light to multiple light receivers, or multiple light transmitters may each project light to the same light receiver.

When the user's finger 104 blocks the light received by one or more of the light receivers in the first array and one or more of the light receivers in the second array, the current location of the user's finger 104 with respect to the display 102 can be determined based on which of the light receivers in the first array and which of the light receivers in the second array are not currently receiving light. According to some implementations, the light receivers 120 and 206 may be infrared receivers that detect infrared light projected across the display 102 from one side of the display to another. Additionally, in some implementations, the light projected across the display 102 may be pulsed in a predetermined pattern that is detectable by the light receivers 120 and 206 so that the light receivers 120 and 206 are able to distinguish between light produced by the light transmitters 114 and 202 of the electronic device 100 and light received from other external light sources, such as the sun, bright lights, and the like.

In some implementations, the electronic device 100 may include the display 102, as described above, maintained within a device housing 122 of plastic, metal or other suitable material. Further, the electronic device 100 may include a lightguide 124 having one or more reflective surfaces for directing light from the light transmitters 114 to another location of the electronic device 100. The lightguide 124 may be constructed from a material suitable for light guiding, such as acrylic, glass, or the like.

In a particular example, the lightguide 124 may include a first reflective surface 126, a second reflective surface 128, a third reflective surface 130, and a fourth reflective surface 132. In some cases, one or more of the reflective surfaces may be oriented at a non-zero angle relative to the x-dimension (as defined in FIG. 1). However, the reflective surfaces may be oriented at any angle suitable for directing light from the light transmitters 114 to another location of the electronic device 100 to implement various light-based applications, e.g., light-based touch control technology.

The light transmitters 114 may be positioned proximate to a first side (e.g., 106, 116, or both) of the display 102 to emit light into the lightguide 124. The light receivers 120 may be positioned proximate to a second side (e.g., 108, 118, or both) of the display 102, that is opposite to the first side of the display 102, to receive light projected via the reflective surfaces of the lightguide 124.

In some implementations, the light transmitter 114 may be positioned or operable to emit a ray of light 110 at a non-zero angle relative to the display 102. For instance, the light transmitter 114 may be oriented such that it emits a ray of light 114 at a non-zero angle relative to a top/front display surface 134, a bottom/back display surface 136 that is opposite to the top/front display surface 134, or both. The light transmitter 114 may emit the ray of light 110 towards the first reflective surface 126, which may be disposed proximate to or at the first side 106 of the display 102. The first reflective surface 126 may be positioned to reflect the ray of light 110 received from the light transmitter 114 towards the second reflective surface 128, which may be disposed proximate to or at the first side 106 of the display 102.

In some instances, at least a portion of the first reflective surface 126 may be located below the display 102, and at least a portion of the second reflective surface 128 may be located above the display 102. As such, the ray of light 110 may be incident upon the first reflective surface 126 at a location below the display 102. The first reflective surface 126 may reflect the ray of light 110 such that the reflected ray of light 110 is subsequently incident upon the second reflective surface 128 at a location above the display 102.

The second reflective surface 128 may reflect the ray of light 110 received from the first reflective surface 126 such that the ray of light 110 travels along one or more paths above and across at least a portion of the display surface 134, towards the third reflective surface 130, which may be disposed proximate to or at the second side 108 of the display 102. As described above, the second side 108 of the display 102 may be opposite to the first side 106 of the display 102. The third reflective surface 130 may be positioned to reflect the ray of light 110 received from the second reflective surface 128 to a fourth reflective surface 132, which may be disposed at the second side 108 of the display 102. The fourth reflective surface 132 may be positioned to reflect the ray of light 110 received from the third reflective surface 130 to the light receiver 120.

In some instances, at least a portion of the third reflective surface 130 may be located above the display 102, and at least a portion of the fourth reflective surface 132 may be located below the display 102. As such, the ray of light 110 may be incident upon the third reflective surface 130 at a location above the display 102. The third reflective surface 130 may reflect the ray of light 110 such that the reflected ray of light 110 is subsequently incident upon the fourth reflective surface 132 below the display 102. The light receiver 120 may be positioned to detect the ray of light 110 received from the fourth reflective surface 132 to provide touch sensing in association with the display, as described above.

According to some implementations, the electronic device 100 may include a mid-chassis 138 disposed below the bottom surface 136 of the display 102. The mid-chassis 138 may include, for example, one or more substrates that mechanically reinforce or support the display 102. However, in some implementations, one or more substrates or other components may be disposed below the display in addition to or in lieu of the mid-chassis 138.

Additionally, the light transmitter 114 may be mounted on or otherwise coupled to a substrate 142. Similarly, the light receiver 120 may be mounted on or otherwise coupled to a substrate 150. For example, the light transmitter 114 may be surface mounted or otherwise coupled to a printed circuit board (PCB). The PCB can be a dedicated PCB that enables operability of the light transmitters 114, or the PCB may enable operability of various components in the electronic device 100. In some cases, the light transmitter 114, the substrate 142, or both, may be oriented at a non-zero angle relative to one or more of the display 102, the top display surface 134, or the bottom display surface 136. As such, the light transmitter 114 may emit a ray of light 110 at a non-zero angle relative to the display 102. For simplicity, it should be understood that in this disclosure a reference to a position of a component relative to the display 102 may additionally or alternatively indicate the same relative position of the component with respect to one or more of the top display surface 134 or the bottom display surface 136.

The light transmitter 114, the substrate 142, or both, may be oriented non-parallel to the display 102. For example, the top display surface 134 or the bottom display surface 136 may be oriented at, define, or otherwise be associated with a first plane, while the substrate 142 may be oriented at, define, or otherwise be associated with a second plane that is non-parallel to the first plane. Similarly, the light transmitter 114, may be oriented at, define, or otherwise be associated with a third plane that is non-parallel to the first plane. Accordingly, the light transmitter 114 may emit a ray of light 110 that is oriented at, defines, or is otherwise associated with a fourth plane that is non-parallel to the first plane.

In some implementations, the substrate 142 may be coupled to lightguide 124. For instance, a portion of the substrate 142 may be adhesively bonded to a portion of the lightguide 124. In a particular example, the light transmitter 114 may be mounted on a first portion 144 of the top surface of the substrate 142. A second portion 146 of the top surface of the substrate 142, that is distal to the first portion 144 of the top surface of the substrate 142, may be adhesively bonded to a portion of the lightguide 124 proximate to the first reflective surface 126. Accordingly, the position of the light transmitter 114 relative to the first reflective surface 126 may be fixed.

To appreciate the space savings that these space efficient component configurations may realize, suppose, for example, that the light transmitter 114 were oriented to emit light parallel to the display 102 instead of non-parallel to the display 102. In this example, the relative positioning of two or more of the light transmitter 114, the substrate 142, the lightguide 124, or the display 102 may result in an inefficient use of space in at least one of the x- or z-dimensions, as described in some examples below.

As indicated by the example first alternative light transmitter-substrate component configuration 150, if the light transmitter 114 were disposed adjacent to the first side 106 of the display 102, the substrate 142 on which the light transmitter 114 is mounted would extend laterally away from the display 102 and towards an inner surface 148 of the housing 122. As this example illustrates, a greater distance would be required between the first side of the display 106 and the inner surface 148 of the housing 122 to accommodate the first alternative component configuration 150. That is, compared to space efficient component configurations described herein, the first alternative component configuration 150 may inefficiently use space along the x-dimension. This inefficient use of space may be exacerbated when taking into account the space that would be required to accommodate the lightguide 124.

In another example, a second alternative component configuration (not shown) may, like the first alternative component configuration 150, be oriented to emit light parallel to the display 102. However, unlike the first alternative component configuration 150, at least a portion of the second alternative component configuration may be disposed below at least one of the display 102 or the mid-chassis 138. That is, at least a portion of the second alternative component configuration may be tucked within otherwise unused space under the display 102. Configuring the components in this manner may improve space efficiency with respect to the x-dimension compared to the first alternative component configuration 150, but may inefficiently use space along the z-dimension.

For instance, compared to space efficient component configurations described herein, the second alternative component configuration may require greater spacing between reflective surfaces of the lightguide 124 to direct the light 110 above and across at least a portion of the top display surface 134. Additionally or alternatively, the second alternative component configuration may require that one or more of the reflective surfaces of the lightguide 124 be angled such that the lightguide 124 occupies more space along the z-dimension compared to space efficient component configurations described herein. For example, an angle between the first reflective surface 126 and the second reflective surface 128 may be greater in the second alternative component configuration than in space efficient component configurations within the scope of this disclosure.

In general, the cover component 140 may be formed from various layers, such as a cover glass and an outer layer, and may be manufactured to be less than 1.0 mm thick. In some examples, the cover component 140 may be formed from one or more materials selected to provide a specific hardness and rigidity to the electronic device 100.

In some implementations, the cover component 140 may be configured to protect the display 102 from damage, such as scratching, chipping, peeling, as well as to provide rigidity and stiffness to the electronic device 100. In some cases, the cover component 140 may be configured to run the entire width and height of the electronic device 100 to provide some degree of structural support to the electronic device 100, as well as to improve the resistance of the electronic device 100 to bending, snapping, or both.

In some examples, the cover component 140 may provide anti-glare properties, anti-reflective properties, anti-smudging or anti-fingerprinting properties, anti-cracking properties, among others.

Figure 3:
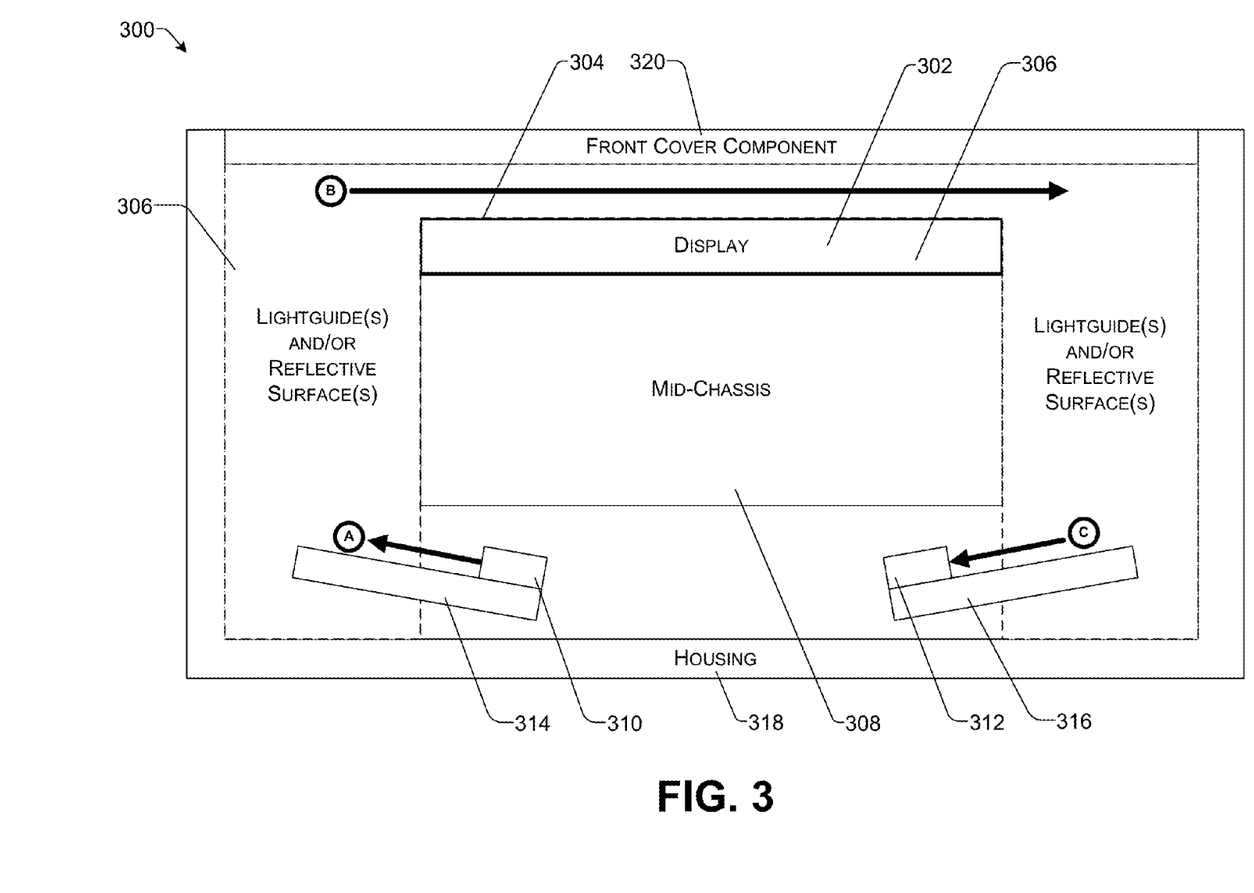
FIG. 3 illustrates a schematic cross-section of an example electronic device having space efficient component configurations according to some implementations.

FIG. 3 illustrates a schematic cross-section of an example electronic 300 device having space efficient component configurations according to some implementations. The electronic device 300 may include an electronic display 302 having a top display surface 304 and a bottom display surface 306 that is opposite to the top display surface 304. The electronic device 300 may also include a mid-chassis 308 disposed below the bottom display surface 306. The mid-chassis 308 may include, for example, one or more substrates that provide structural support for the display 302. However, in some implementations, substrates or components that serve other purposes may be disposed below the display 302 in addition to or instead of the mid-chassis 308.

In some implementations, a light-based touch control technology may be associated with the display 302 for receiving a touch. For example, one or more light sources or transmitters 310 may emit light that is directed over the display 302 and to one or more corresponding light sensors or receivers 312, as generally indicated by arrows A, B and C of FIG. 3. To direct the light in such a manner, the electronic device 300 may include one or more lightguides 306. In some cases, each lightguide 306 may include one or more reflective surfaces (not shown) configured to reflect the light such that the light follows one or more paths generally indicated by arrows A, B and C of FIG. 3.

According to some implementations, the light sources 310 may include one or more light-emitting diodes (LEDs) configured to emit infrared (IR) light. The light sensors 312 may include one or more photodiodes configured to detect IR light. Further, the lightguides 306 may include one or more reflective surfaces configured to reflect IR light. In a particular implementation, some or all of the reflective surfaces may be coated with an IR reflective substance. Coating the reflective surfaces with the IR reflective substance allows for contacting the reflective surfaces with other components or surfaces of the electronic device 300 without negatively impacting the quality of reflection. That is, with the IR reflective coating, the reflective surfaces may be capable of reflecting light in the same manner regardless of whether the reflective surfaces are contacting another component or surface of the electronic device 300. Introducing an air gap between reflective surfaces and other components or surfaces of the electronic device 300 may avoid the issue of the other components or surfaces affecting how the reflective surfaces reflect light. The air gap, however, may comprise wasted (i.e., otherwise unusable) space. Thus, component configurations that reduce or eliminate the air gap by coating the reflective surfaces with the IR reflective substance may comparatively be space efficient.

Additionally, the light source 310 may be mounted on or otherwise coupled to a substrate 314. Similarly, the light sensor 312 may be mounted on or otherwise coupled to a substrate 316. For example, as similarly discussed above with reference to FIG. 1, the light source 310 may be surface mounted or otherwise coupled to a printed circuit board (PCB). In some cases, the light source 310, the substrate 314, or both, may be oriented at a non-zero angle relative to the display 302. As such, the light source 310 may emit light (generally indicated by arrow A) at a non-zero angle relative to the display 302.

In some cases, the light source 310, the substrate 314, or both, may be oriented non-parallel to the display 302. For example, the top display surface 304 or the bottom display surface 306 may be oriented at, define, or otherwise be associated with a first plane, while the substrate 314 may be oriented at, define, or otherwise be associated with a second plane that is non-parallel to the first plane. Similarly, the light source 310, may be oriented at, define, or otherwise be associated with a third plane that is non-parallel to the first plane. Accordingly, the light source 310 may emit a ray of light that is oriented at, defines, or is otherwise associated with a fourth plane that is non-parallel to the first plane.

In some implementations, the lightguide 306 may be configured to direct light emitted by the light source 310 from a first level that is below the display 302 to a second level that is above the top display surface 304. For instance, the light source 310 may be disposed below the display 302, or below both the display 302 and the mid-chassis 308. Accordingly, the light source may emit light, as indicated by arrow A, from a first level that is below the display 302. The lightguide 306 may then direct to a second level that is above the top display surface 304. At the second level, the light travels across at least a portion of the top display surface 304, as indicated by arrow B. Accordingly, as indicated by arrows A and B, the light may initially (i.e., at emission) propagate along a first path (indicated by arrow A) that is non-parallel to a second path (indicated by arrow B) along which the light may propagate at the second level.

The lightguide 306 may also be configured to direct light from the second level that is above the top display surface 304 to the light sensor 312 (generally indicated by arrows B and C, respectively, of FIG. 3). In some cases, the light sensor 312 may be disposed below the display 302. Accordingly, in some examples, the positioning of the light sensor 312 may be a mirror image of the positioning of the light source 310.

In some examples, one or more of the display 302, the mid-chassis 308, the lightguides and/or reflective surfaces 306, the light sources 310, the light sensors 312, the substrates 314 and 316, or other components of the electronic device 300, may be at least partially enclosed by at least one of a housing 318 or a front cover component 320. The housing 318 may be constructed of plastic, metal or other suitable material. In general, the front cover component 320 may be formed from various layers, such as a cover glass and an outer layer. For instance, the front cover component 320 may be formed from one or more materials selected to provide a specific hardness and rigidity to the electronic device 300.

In some implementations, the front cover component 320 may be configured to protect the display 302 from damage, such as scratching, chipping, peeling, as well as to provide rigidity and stiffness to the electronic device 300. In some cases, the front cover component 320 may be configured to run the entire width and height of the electronic device 300 to provide some degree of structural support to the electronic device 300, as well as to improve the resistance of the electronic device 300 to bending, snapping, or both. In some examples, the cover component 320 may provide anti-glare properties, anti-reflective properties, anti-smudging or anti-fingerprinting properties, anti-cracking properties, among others. Additionally, or alternatively, the front cover component 320 may be configured to be a cosmetic piece that contributes to the look and feel of the device 300.

Figure 4:
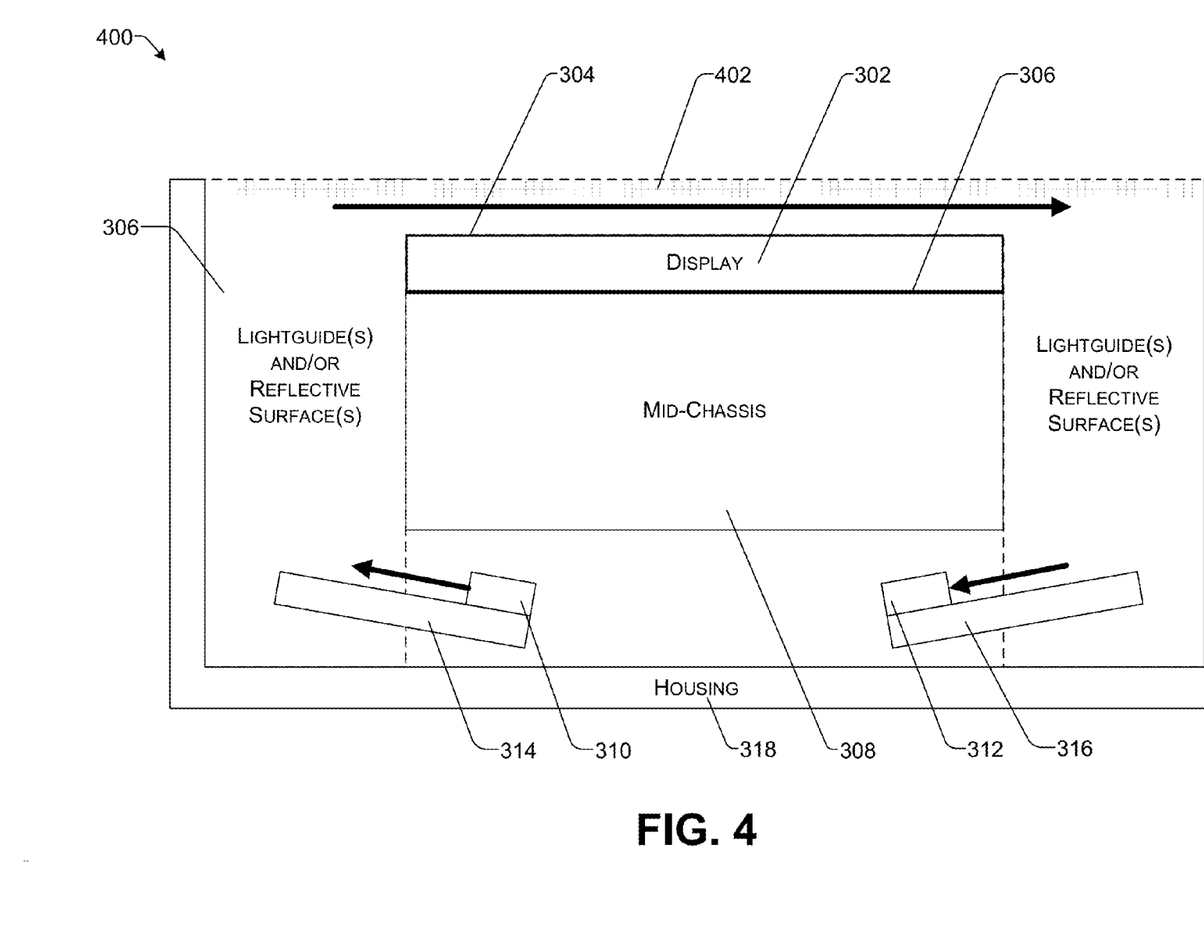
FIG. 4 illustrates a schematic cross-section of another example electronic device having space efficient component configurations according to some implementations.

FIG. 4 illustrates a schematic cross-section of another example electronic device 400 having space efficient component configurations according to some implementations. In some cases, the electronic device 400 may not include a front cover component, thus reducing space used in the z-dimension.

Rather than including a separate front cover component, the electronic device 400 may externally expose a coated portion 402 of the lightguide 306 that resides above the display 302. The coated portion 402 of the lightguide 306 may be coated with a substance that provides one or more of the properties that would be provided by a front cover component. That is, the lightguide 306 may be used as a front cover component in some space efficient configurations.

For example, the coated portion 402 may be configured to protect the display 302 from damage, such as scratching, chipping, peeling, as well as to provide rigidity and stiffness to the electronic device 400. In some cases, the coated portion 402 may be configured to run the entire width and height of the electronic device 400 to provide some degree of structural support to the electronic device 400, as well as to improve the resistance of the electronic device 400 to bending, snapping, or both. In some examples, the coated portion 402 may provide anti-glare properties, anti-reflective properties, anti-smudging or anti-fingerprinting properties, anti-cracking properties, among others. Additionally, or alternatively, the coated portion 402 may be configured to be a cosmetic piece that contributes to the look and feel of the device 400.

In some instances, the coated portion 402 may be coated with an infrared (IR) transparent substance. Accordingly, IR light may travel through the lightguide 306, including through the coated portion 402. For example, IR light may travel through the coated portion 402 over at least a portion of the display 302 to implement light-based touch control.

Figure 5:
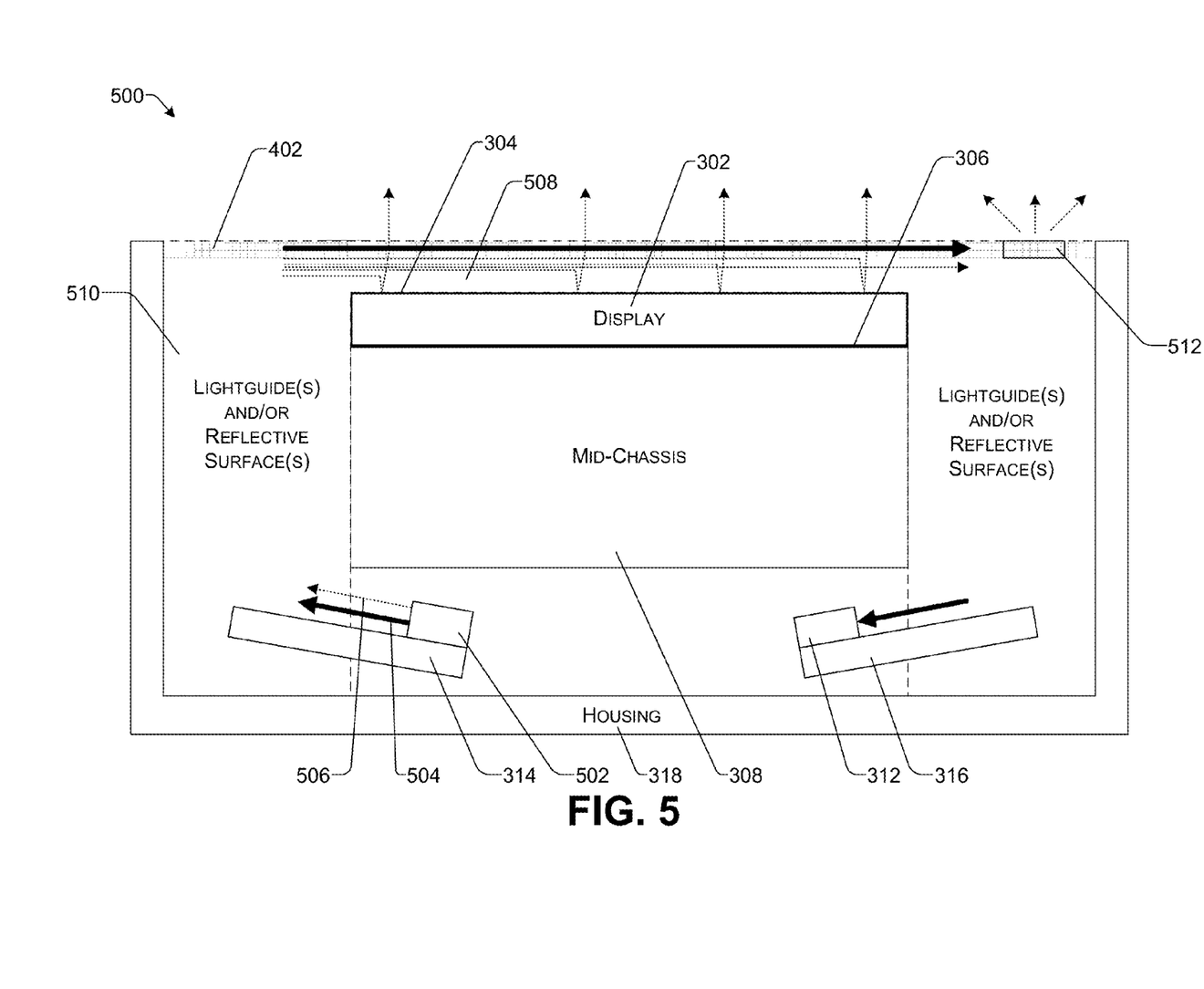
FIG. 5 illustrates a schematic cross-section of yet another example electronic device having space efficient component configurations according to some implementations.

FIG. 5 illustrates a schematic cross-section of yet another example electronic device 500 having space efficient component configurations according to some implementations. When illumination of the top display surface 304 is desired by a user, or when low light conditions are detected by the device 500, visible light may be provided to the top display surface 304 to illuminate an image presented on the display 302.

In some instances, the electronic device 500 may include a diffuser 508 disposed above the display 302 for diffusing visible light projected to the display 302. The diffuser 508 may include various different configurations for diffusing visible light evenly over the top display surface 304, such as to avoid bright spots, dim spots, and the like. The diffuser 508 may be integrated into the lightguide 510. However, in other implementations, the diffuser 508 may be an integral part of the display, while in yet other implementations, the diffuser 508 may be eliminated altogether.

A dual-wavelength or dual-mode light transmitter 502 may be employed that can be selectively activated to emit the first type of light 504 that is detectable by the light sensors 312, and that can be independently selectively activated to also emit a second type of light 506 that is different from the first type of light 504, and that provides visible light to the top display surface 304 to illuminate at least a portion of the display 302.

In some implementations, the first type of light 504 may be a first wavelength of light in the infrared (IR) range of the spectrum (i.e., approximately greater than 700 nm) and the second type of light 506 may be a second wavelength of light in the visible light spectrum (i.e., approximately 380-760 nm). Further, in some implementations, the first type of light 504 may be pulsed light generated by rapidly cycling the light transmitter 502 that produces the first type of light 504. Accordingly, in some implementations, the first type of light 504 may be visible light or IR light that is rapidly pulsed in a pattern detectable by the light sensors. Accordingly, in some implementations, the first type of light 504 may be unsuitable or unable to illuminate the display, while the second type of light 506 may be light in the visible spectrum delivered at a generally constant intensity so that flickering or other variations in lighting intensity are not noticeable to a viewer of the display 302.

In some implementations, the light transmitter 502 may be a dual-mode light emitting diode (LED) capable of producing the two different types of light. For example, the LED may include a first lead that can receive electrical current to cause the LED to produce IR light, and the LED may include a second lead that can receive electrical current to cause the LED to produce white light or other suitable range of visible light. Additionally, in some implementations, rather than a dual-mode light transmitter 502, two separate light transmitters 502 may be used to produce the two different types of light. For example, two different types of LEDs may be utilized as the light transmitters 502, with a first type of LED producing IR light and a second type of LED producing visible light at a generally constant intensity.

According to some implementations, the electronic device 500 may include a sign-of-life indicator 512 for indicating to a user a level of electric power currently being supplied to the electronic device 500. For example, the electronic device 500 may include a front cover component (including a lightguide 510 or a diffuser 508 acting as a front cover component) disposed above the top/front display surface 304 and comprising at least one external surface of the device 500. The sign-of-life indicator 512 may be disposed, at least in part, at or near the external surface of the front cover component. Visible light 506 emitted by the light transmitter 502 may illuminate the front cover component and the sign-of-life indicator 512. Accordingly, the sign-of-life indicator 512 may expose to a user an intensity of the visible light 502 that may vary based at least in part on an amount of electric power supplied to the device 500.

In a particular implementation, the sign-of-life indicator 512 may be a logo disposed at the front external surface of the device 500. Accordingly, the logo may serve sign-of-life indicator purposes as well as advertising and source indicator purposes.

Figure 6:
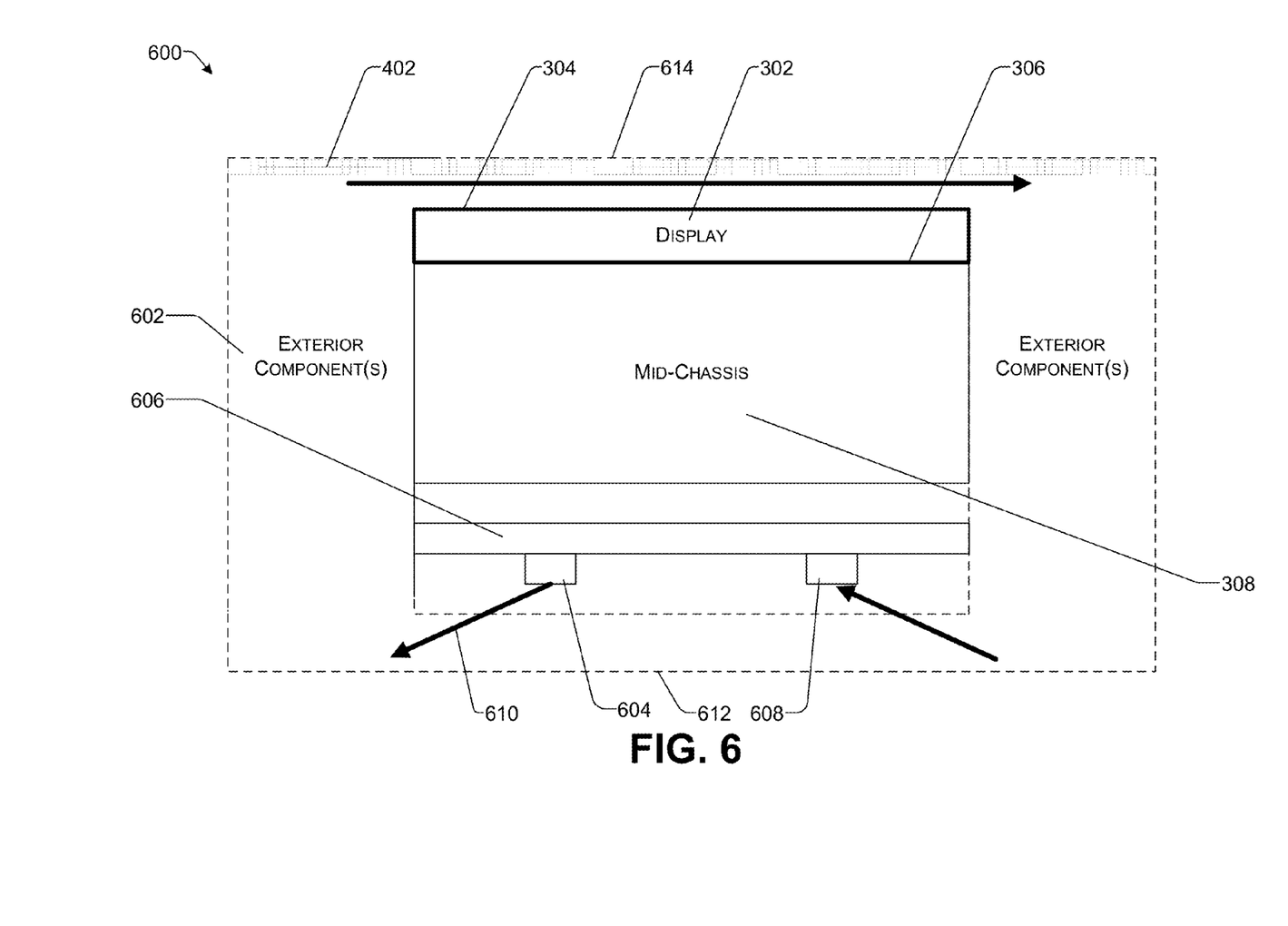
FIG. 6 illustrates a schematic cross-section of still another example electronic device having space efficient component configurations according to some implementations.

FIG. 6 illustrates a schematic cross-section of still another example electronic device 600 having space efficient component configurations according to some implementations. As in the illustrated example, the electronic device 600 may utilize one or more of its exterior components 602 to function as one or more lightguides or as one or more reflective surfaces.

According to some implementations, the electronic device 600 may include one or more light transmitters 604 coupled to a substrate 606 disposed below the display 302. In some cases, the light transmitter 604 and the substrate 606 may be disposed below the mid-chassis 308 that provide support for the display 302.

In a particular implementation, the substrate 606 may be a printed circuit board (PCB), such as a primary PCB of the electronic device 600. Various other electronic components configured to carry out various functions associated with the electronic device 600 may be mounted or otherwise coupled to the primary PCB. Utilizing the primary PCB of the electronic device 600 as the substrate 606 for both the light transmitter 604 and the light sensor 608 may eliminate the need for separate, dedicated substrates that would otherwise support the light transmitter 604 or the light sensor 608. As such, the electronic device 600 may save space in one or more of the x-, y- or z-dimensions.

The light transmitter 604 may be a top-firing light transmitter, such as a top-firing light-emitting diode (LED) or the like. That is, the light transmitter 604 may emit light 610 from a top or bottom portion of the light transmitter 604. In some implementations, however, the light transmitter 604 may be a side-firing light transmitter, such as a side-firing LED. Thus, the light transmitter 604 may additionally, or alternatively, emit light from a side portion of the light transmitter 604.

As in the illustrated example, the light transmitter 604 may emit light 610 towards a bottom/back portion of the device 600. The bottom/back portion may be a part of the exterior components 602 configured to function as one or more lightguides or as one or more reflective surfaces. The side and front (or top) portions of the device may also be parts of the exterior components 602 configured to function as one or more lightguides or as one or more reflective surfaces. In some cases, the bottom/back portion may include a bottom/back external surface 612 of the device, and the top/front portion may include a top/front external surface 614 of the device.

As generally indicated by the arrows of FIG. 6, the exterior components 602 may direct the light 610 from the bottom/back portion of the device 600 to a first side portion of the device 600; from the first side portion to a top/front portion (e.g., a front cover) of the device 600; from the top portion to a second side portion of the device 600; and from the second side portion back to the bottom/back portion of the device 600, where the light 610 is directed to the light sensor 608. Such utilization of the exterior components 602 of the device 600 as one or more lightguides or as one or more reflective surfaces may reduce the number of components necessary to implement various light-based features of the electronic device 600, such as light-based touch control, illumination of the display, illumination of a sign-of-life indicator, and so on.

Figure 7:
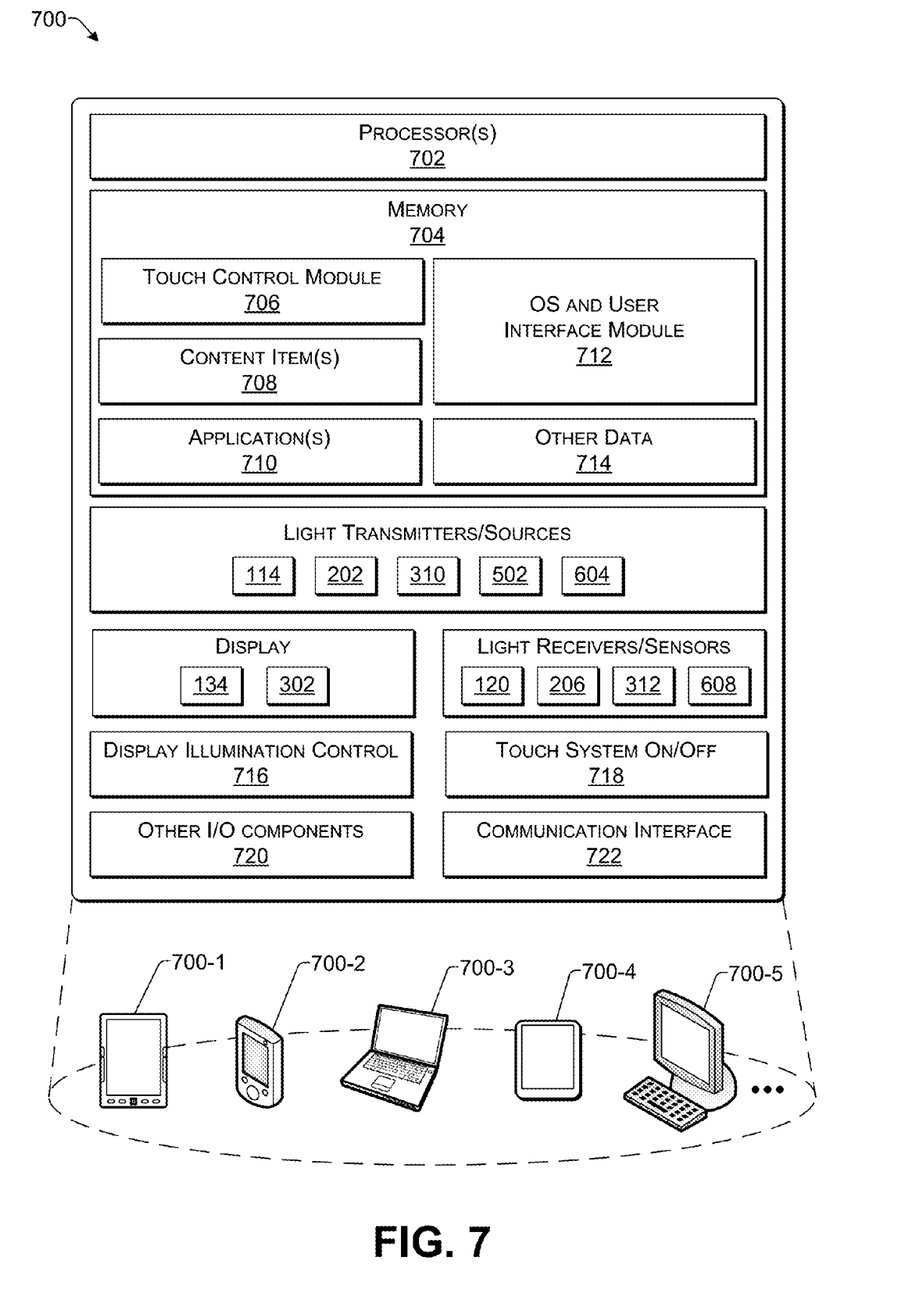
FIG. 7 is a block diagram illustrating selected example components of an electronic device according to some implementations.

FIG. 7 is a block diagram of select example components of an electronic device 700 according to some implementations. As mentioned above, the electronic device 700 may be any electronic device having a display. Several non-limiting examples of such devices may include eBook readers 700-1, cellular phones and smart phones 700-2, netbook and laptop computers 700-3, tablet computing devices 700-4, and personal computers 700-5, as well as portable media players, navigation devices, cash registers, appliances, gaming devices, kiosks, touch screen devices, computer peripherals, home electronics, robots, industrial equipment and machinery, and so forth. In a very basic configuration, the electronic device 700 includes or accesses components such as at least one processor 702 and a memory 704. Each processor 702 may itself comprise one or more processors or cores. Depending on the configuration of the electronic device 700, the memory 704 may be an example of non-transitory computer-readable media and may include volatile and nonvolatile memory, mass storage, removable storage, or the like. For instance, the memory 704 may include, but is not limited to, RAM, ROM, EEPROM, flash memory, solid-state drives, memory cards, magnetic disks, optical disks, or other memory or storage technology. Thus, the memory 704 may include any medium that can be used to store computer-readable instructions and data that can be accessed by the electronic device 700.

The memory may include a touch control module 706 that includes functionality, executable instructions, control logic, or the like, for controlling the operation of the light-based touch control arrangement described herein. For example, the touch control module 706 may be part of a light-based touch sensing system that receives input from one or more of the light sensors 120, 206, 312 or 608 for determining a location of a user's finger or other object in relation to the display 134 or 302 for enabling interaction with an image presented on the display 134 or 302. For instance, the touch control module 706 may include one or more algorithms that calculate the position of the user's finger dynamically in real-time in relation to information corresponding to an image presented on the display 134 or 302 for performing one or more functions provided by the electronic device 700. In some instances, the touch control module 706 may calculate motion of user's finger, such as the direction of travel, speed of travel, predicted path of travel, and the like. In some implementations, the touch control module 706 may also control the delivery of pulsed light as the first type of light from the light sources 114, 202, 310, 502 or 604 to the light sensors 120.

In addition, in some implementations, the touch control module 706 may also control the provision of the second type of light as visible light to the display 134 or 302. For example, the touch control module 706 may control how many light sources are active to provide visible light, which of the light sources of multiple light sources are active, or the like, based on activation of one or more controls by a user, a sensed ambient light condition, an image currently presented on the display 134 or 302, or the like.

In some implementations, the memory 704 may store any number of other functional components that are executable on the processor 702, and may optionally include content items 708, applications 710, or the like, that can be executed or rendered by the processor 702 of the electronic device 700. The memory 704 may also maintain an operating system (OS) and user interface module 712 that is executable by the processor 702. For example, the operating system may include a kernel operatively coupled to one or more device drivers and may provide a user interface for enabling a user to access functions and features of the electronic device 700. In some instances, the OS and user interface module 712 may allow a user to select one or more of the content items 708 for consumption on the electronic device 700, such as by displaying, playing, or the like. As another example, the OS and user interface module 712 may provide menus and other navigational tools to facilitate interaction with the electronic device 700 by a user. In some implementations, the OS and user interface module 712 may enable operation of a browser or other application 710 that facilitates access to sites over a network, such as websites, online merchants, etc.

The memory 704 may also store other data 714. Examples of other data 714 may include executable programs, drivers and associated data, databases, user settings, configuration files, device status, user credentials, digital rights management information, and so forth. In some implementations, the memory 704 may further include a memory portion designated as an immediate page memory (not shown) to temporarily store one or more pages of an electronic book or other content item 708. In some instances, the pages held by the immediate page memory are placed therein a short period before a next page request is expected.

The electronic device 100 of FIG. 7 further includes one or more light sensors 120, 206, 312 or 608 and one or more of the light sources 114, 202, 310, 502 or 604 described above according to the various implementations. Furthermore, in some implementations, other types of light sources may be substituted for one or more of the light sources described herein. Accordingly, implementations herein are not limited to use with the examples of light sources described herein.

FIG. 7 further illustrates the display 134 or 302, which may be passive, emissive or any other form of display. As mentioned above, the display 134 or 302 may present content in a human-readable format to a user. In some implementations, the display 134 or 302 may include electrophoretic, pigmented electrophoretic, electrofluidic, interferometric, cholesteric liquid crystal, bi-stable LCDs, MEMS or other stable display technology that retains an image with no or little power applied to the display. In one implementation, the display 134 or 302 uses electronic paper or electronic ink display technology, which is bi-stable and enables the display 134 or 302 to maintain text or other images with very little or no power. In other implementations, an active display such as a liquid crystal display may be used, and implementations herein may provide backlighting to the display. The display 134 or 302 may comprise drive electronics, such as a display drive matrix configured to affect individual pixels within the display 134 or 302. In some implementations, multiple displays 134 or 302 may be present on the electronic device 700. When multiple displays are present, these displays may be of the same or different types. For example, one display 134 or 302 may be an electrophoretic display while another may be a liquid crystal display. For convenience only, the display 134 or 302 is shown in a generally rectangular configuration. However, it is understood that the display 134 or 302 may be implemented in any shape, and may have any ratio of height to width.

FIG. 7 further illustrates that the electronic device 700 may include a display illumination control 716 that can be activated by a user for controlling the visible light provided to the display 134 or 302. For example, the display illumination control 716 may include one or more control buttons that a user may activate to control a level of light delivered to the display surface. In some implementations, the user may activate the display illumination control 716 to provide power to one or more of the second type of light sources for providing visible light to at least a portion of the display 134 or 302. Additionally, or alternatively, the display illumination control 716 may include a light sensor, or the like, that may sense ambient light conditions and provide the information to the touch control module 706, the OS 712, or other functional component that may automatically determine a suitable amount of visible light to deliver to the display 134 or 302.

Additionally, in some implementations, the electronic device 700 may include a touch system on/off control 718 that may allow a user to turn off and on the light-based touch sensing system described herein such as for conserving power of the device or the like. Accordingly, in some implementations, the display illumination lighting may be in a powered-on condition while the touch control system lighting is in a powered off condition, vice versa, or both the display illumination lighting and the touch control system lighting may be powered on and active contemporaneously.

In some implementations, the electronic device 700 may further be equipped with various other input/output (I/O) components 720. Examples of other I/O components 720 may include one or more audio speakers, various user actuable controls, (e.g., physical controls 126 discussed above), a microphone, a camera, connection ports, and so forth. For example, the operating system and user interface module 712 of the electronic device 100 may include suitable drivers configured to accept input from a keypad, keyboard, or other user actuable controls and devices included as the I/O components 720. In some implementations, the other I/O components 720 may include page turning buttons, navigational keys, a power on/off button, selection keys, and so on. The other I/O components 720 may further include various external controls and input devices such as a virtual or physical keyboard, a pointing stick, touchpad, a mouse, a trackball or joystick type mechanism, a docking station, and various other controls for performing various desired functions.

Additionally, in some implementations, the electronic device 700 may include a communication interface 722. In some implementations, the communication interface may support wired and/or wireless connection to various networks, such as cellular networks, radio, WiFi networks, short-range or near-field networks (e.g., Bluetooth®), infrared signals, and so forth. The communication interface 722 may allow a user of the electronic device 700 to download content items 708 from a content item service, such as a from a website or other online service. The communication interface 722 may further allow a user to access storage on another device, such as a user's computing device, a network attached storage (NAS) device, or the like.

The electronic device 700 may have additional features or functionality. For example, the electronic device 700 may also include various interfaces or ports supporting various protocols, a global positioning system (GPS) device, a PC Card component, a projector, peripheral components, and so forth.

Various instructions, methods and techniques described herein may be considered in the general context of computer-executable instructions, such as program modules stored on computer-readable media, such as memory 704, and executed by the processor 702. Generally, program modules include routines, programs, objects, components, data structures, etc. for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Further, the example electronic device 700 illustrated in FIG. 7 is just one non-limiting example of a suitable electronic device according to some implementations. Numerous other implementations, variations and configurations will be apparent to those of skill in the art in view of the disclosure herein.

Figure 8:
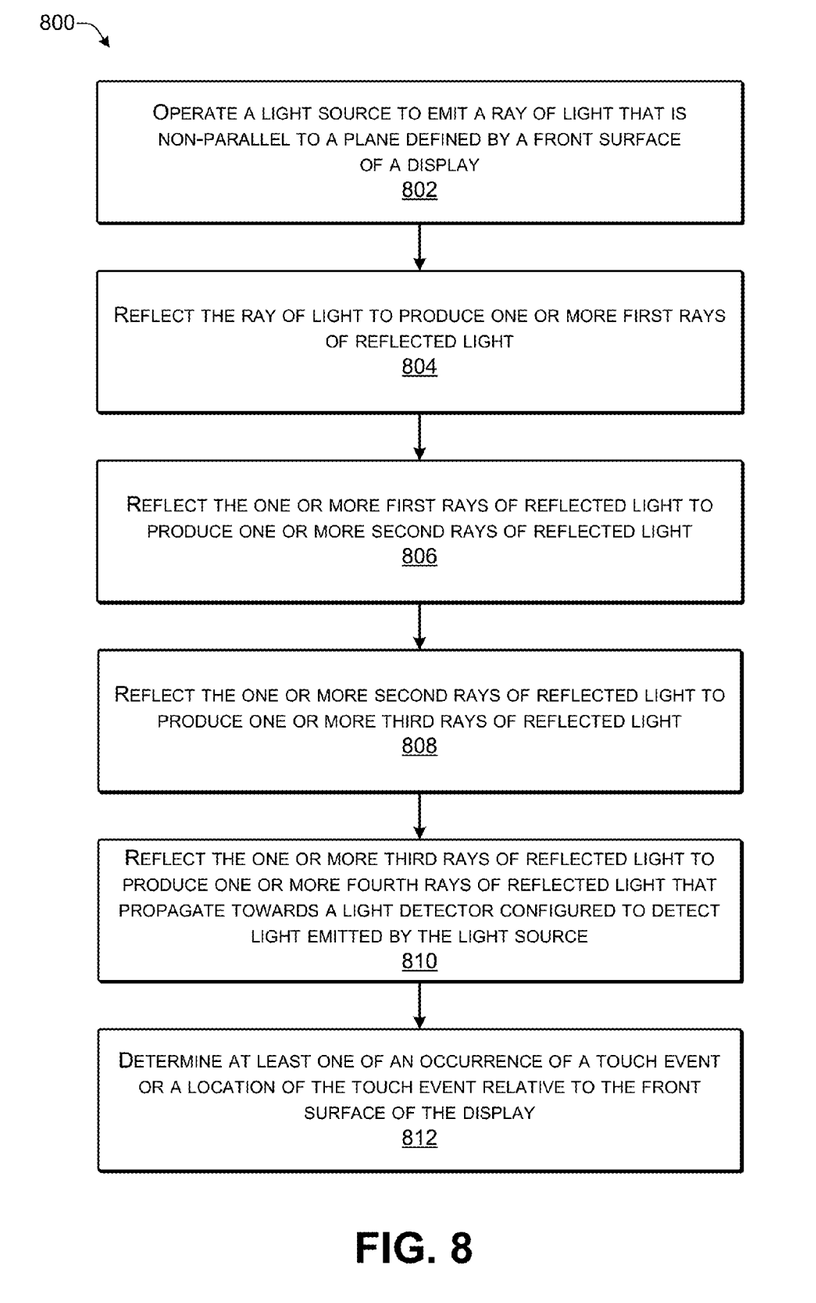
FIG. 8 is a flow diagram illustrating an example process according to some implementations.

FIG. 8 illustrates an example process 800 according to some implementations. This process 800 is illustrated as a logical flow diagram, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process, and not all of the operations are necessarily required. The process 800 is described with reference to one or more of the electronic devices of FIGS. 1-7, although other devices, architectures and systems may implement this process.

At block 802, the electronic device operates a light source to emit a ray of light that is non-parallel to a plane defined by a front surface of a display. For example, as discussed above with reference to FIG. 3, the electronic device 300 may include a light source 310, such as an LED, that emits light at a non-zero angle relative to the top display surface 304.

At block 804, the electronic device may reflect the ray of light to produce one or more first rays of reflected light that propagate from proximate the back surface of the display to proximate the front surface of the display. For example, the electronic device 300 may include a lightguide 306 having one or more reflective surfaces. The lightguide may be configured to direct light emitted from the light source 310 to the light sensor 312.

At block 806, the electronic device may reflect the one or more first rays of reflected light to produce one or more second rays of light that propagate substantially parallel to at least a portion of the front surface of the display.

At block 808, the electronic device may reflect the one or more second rays of reflected light to produce one or more third rays of reflected light that propagate from proximate the front surface of the display to proximate the back surface of the display.

At block 810, the electronic device may reflect the one or more third rays of reflected light to produce one or more fourth rays of reflected light that propagate towards a light detector configured to detect light emitted by the light source. The electronic device may, at block 812, determine at least one of an occurrence of a touch event or a location of the touch event relative to the top surface of the display. For example, the electronic device may base such a determination, at least in part, on an interference with the one or more second rays of reflected light that prevents the light detector from detecting light emitted by the light source.

Other variations will also be apparent to those of skill in the art in view of this disclosure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A device comprising:
a processor;
a display having a front side and a back side that is opposite to the front side;
a mid-chassis, the mid-chassis disposed beneath the back surface of the display;
a light transmitter configured to emit infrared (IR) light, the light transmitter being disposed (i) beneath the mid-chassis and (ii) proximate to a first side of the display, wherein the IR light emitted by the light transmitter defines a ray that is non-parallel to a plane defined by the front side of the display;
a light receiver configured to detect the IR light emitted by the light transmitter, the light receiver being disposed (iii) beneath the mid-chassis and (iv) proximate to a second side of the display, the second side being opposite to the first side; and
a lightguide that includes a plurality of reflective surfaces, the plurality of reflective surfaces being configured to receive the IR light from the light transmitter and direct the IR light across the front side of the display and towards the light receiver to implement touch sensing in association with the display,
wherein the processor in conjunction with the display, the light transmitter, the lightguide, and the light receiver is configured to:
detect interference of the IR light on the front side of the display; and
determine location of a touch input on the front side of the display based on the interference.

2. The device of claim 1, wherein the front side of the display defines a first plane, and the light transmitter is coupled to a substrate having a surface that defines a second plane, the second plane being non-parallel to the first plane.

3. The device of claim 1, wherein the lightguide includes:
a first reflective surface disposed proximate to the first side of the display, wherein the light transmitter is configured to emit the IR light towards the first reflective surface, and wherein the first reflective surface is positioned to reflect the IR light towards a second reflective surface;
the second reflective surface disposed proximate to the first side of the display, wherein the second reflective surface is positioned to reflect the IR light received from the first reflective surface such that the IR light travels across the front side of the display and towards a third reflective surface;
the third reflective surface disposed proximate to the second side of the display, wherein the third reflective surface is positioned to reflect the IR light received from the second reflective surface towards a fourth reflective surface; and the fourth reflective surface disposed proximate to the second side of the display, wherein the fourth reflective surface is positioned to reflect the IR light received from the third reflective surface towards the light receiver.

4. The device of claim 1, wherein the lightguide comprises a front cover component.

5. The device of claim 1, wherein the lightguide includes:
a first reflective surface disposed proximate to the first side of the display and below the mid-chassis, wherein the light transmitter is configured to emit the IR light towards the first reflective surface, and the first reflective surface is positioned to reflect the IR light towards a second reflective surface;
the second reflective surface disposed proximate to the first side of the display and disposed above the mid-chassis, the second reflective surface is positioned to reflect the IR light received from the first reflective surface such that the IR light travels across the front side of the display and towards a third reflective surface;
the third reflective surface disposed proximate to the second side of the display, the third reflective surface is positioned to reflect the IR light received from the second reflective surface towards a fourth reflective surface; and
the fourth reflective surface disposed proximate to the second side of the display and disposed below the mid-chassis, wherein the fourth reflective surface is positioned to reflect the IR light received from the third reflective surface towards the light receiver.

6. The device of claim 1, wherein the light transmitter is angled at a degree greater than zero relative to the mid-chassis.

7. A device comprising:
a display for displaying content to a user, the display having a front surface and a back surface opposite the front surface;
a mid-chassis, the mid-chassis disposed beneath the back surface of the display;
at least one light source operable to emit light, the at least one light source being disposed beneath the mid-chassis, wherein the light emitted by the at least one light source defines a ray that is non-parallel to a plane defined by the front surface of the display; and
at least one lightguide configured to direct the light from the at least one light source to the front surface of the display, and cause the light to travel across at least a portion of the front surface of the display.

8. The device of claim 7, wherein:
the at least one light source is operable to emit infrared (IR) light;
the device comprises at least one light sensor configured to detect the IR light; and
the at least one light guide directs the IR light to the at least one light sensor.

9. The device of claim 8, wherein:
the front surface of the display defines a first plane;
the at least one light source is coupled to a substrate having a surface that defines a second plane, the second plane being non-parallel to the first plane; and
the substrate is coupled to the at least one lightguide.

10. The device of claim 8, wherein the at least one lightguide comprises a plurality of reflective surfaces, the plurality of reflective surfaces including:
a first reflective surface proximate to a first side of the display and disposed below the mid-chassis, the at least one light source being operable to emit the light towards the first reflective surface;
a second reflective surface proximate to the front surface of the display;
a third reflective surface proximate to the front surface of the display; and
a fourth reflective surface proximate to a second side of the display and disposed below the mid-chassis, the second side being opposite the first side, wherein the at least one light sensor is positioned to receive light reflected by the fourth reflective surface.

11. The device of claim 7, wherein the at least one lightguide comprises one or more surfaces that are at least partially coated with an IR reflective sub stance.

12. The device of claim 7, wherein:
the front surface of the display defines a first plane; and
the at least one light source is coupled to a substrate having a surface that defines a second plane, the second plane being non-parallel to the first plane.

13. The device of claim 12, wherein:
the at least one light source comprises a light emitting diode (LED); and
the substrate comprises a printed circuit board (PCB) that is coupled to the at least one lightguide.

14. The device of claim 7, the at least one light source being operable to emit IR light and the at least one lightguide comprising a plurality of reflective surfaces configured to cooperatively direct the IR light emitted by the at least one light source to at least one light sensor that is configured to detect the IR light, wherein the plurality of reflective surfaces include:
a first reflective surface proximate to a first side of the display and disposed below the display, the at least one light source being operable to emit the IR light towards the first reflective surface;
a second reflective surface proximate to the front surface of the display;
a third reflective surface proximate to the front surface of the display; and
a fourth reflective surface proximate to a second side of the display and disposed below the display, the second side being opposite the first side, wherein the at least one light sensor is positioned to receive IR light reflected by the fourth reflective surface.

15. The device of claim 7, wherein the at least one source is angled at a degree greater than zero relative to the mid-chassis.

16. The device of claim 7, wherein the at least one lightguide comprises a front cover component.

17. A method comprising:
providing a display that includes a front surface and a back surface that is opposite to the front surface of the display, and a mid-chassis, the mid-chassis disposed beneath the display;
operating a light source to emit a ray of light that is non-parallel to a plane defined by the front surface of the display;
reflecting the ray of light to produce one or more first rays of reflected light that propagate from beneath the mid-chassis to above the front surface of the display; and reflecting the one or more first rays of reflected light to produce one or more second rays of reflected light that propagate substantially parallel to at least a portion of the front surface of the display.

18. The method of claim 17, further comprising:
reflecting the one or more second rays of reflected light to produce one or more third rays of reflected light that propagate from above the front surface of the display to beneath the back surface of the display; and
reflecting the one or more third rays of reflected light to produce one or more fourth rays of reflected light that propagate towards a light detector, wherein the light source is operable to emit infrared (IR) light and the light detector is configured to detect the IR light.

19. The method of claim 17, the light source being operable to emit IR light, wherein the reflecting the ray of light to produce one or more first rays of reflected light includes reflecting the ray of light off one or more surfaces that are at least partially coated with an IR reflective substance.

20. The method of claim of 17, wherein the light source is angled at a degree greaten than zero relative to the mid-chassis.

* * * * *